(12) United States Patent
Kajiyama

(10) Patent No.: US 9,052,767 B2
(45) Date of Patent: Jun. 9, 2015

(54) INFORMATION TERMINAL DEVICE AND TOUCH PANEL DISPLAY METHOD

(75) Inventor: Kunihiro Kajiyama, Kanagawa (JP)

(73) Assignee: NEC CASIO MOBILE COMMUNICATIONS, LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 13/824,362

(22) PCT Filed: Sep. 8, 2011

(86) PCT No.: PCT/JP2011/070468
§ 371 (c)(1),
(2), (4) Date: Mar. 16, 2013

(87) PCT Pub. No.: WO2012/039288
PCT Pub. Date: Mar. 29, 2012

(65) Prior Publication Data
US 2013/0176261 A1    Jul. 11, 2013

(30) Foreign Application Priority Data
Sep. 22, 2010    (JP) ................................. 2010-211802

(51) Int. Cl.
*G06F 3/041* (2006.01)
*G06F 3/0488* (2013.01)
(Continued)

(52) U.S. Cl.
CPC ............ *G06F 3/0412* (2013.01); *G06F 3/0488* (2013.01); *G06F 3/0482* (2013.01); *G06F 3/04842* (2013.01)

(58) Field of Classification Search
CPC . G06F 3/0346; G06F 3/0421; G06F 3/04812; G06F 3/0482; G06F 3/0485; G06F 3/04883; G06F 2203/04104; G06F 3/0338; G06F 3/038; G06F 3/0412; G06F 3/042; G06F 3/0425; G06F 3/0428; G06F 2203/014; G06F 3/0484; G06F 3/0488; G06F 3/04817; G06F 3/04842; G06F 9/4445; G06F 3/0481; G06F 3/04886; G06F 3/017; G06F 3/048; G06F 3/04815; G06F 3/1454; G06F 1/1694
USPC .................................. 345/156, 169, 173–175
See application file for complete search history.

(56) References Cited

U.S. PATENT DOCUMENTS

| | | | |
|---|---|---|---|
| 7,231,609 B2 * | 6/2007 | Baudisch ....................... | 715/769 |
| 2009/0128505 A1 | 5/2009 | Partridge et al. | |

(Continued)

FOREIGN PATENT DOCUMENTS

| | | |
|---|---|---|
| EP | 1 942 402 A1 | 7/2008 |
| JP | 2002-351620 A | 12/2002 |

(Continued)

OTHER PUBLICATIONS

International Search Report in PCT/JP2011/070468 dated Oct. 4, 2011 (English Translation Thereof).

(Continued)

*Primary Examiner* — Duc Dinh
(74) *Attorney, Agent, or Firm* — McGinn IP Law Group, PLLC

(57) ABSTRACT

When a user touches an icon, a control unit displays pointers for enabling anchors to be selected in directions extending radially from the icon. The pointers are displayed while the user is touching the icon or when a short time has elapsed after a finger has been separated from the icon. A touchable region is displayed at each position in the vicinity of the icon in each of four directions indicated by the pointers. For example, when a touch region is touched using a finger different from the finger touching the display position of the icon, a link corresponding to the touch region is selected.

14 Claims, 4 Drawing Sheets

(51) Int. Cl.
*G06F 3/0482* (2013.01)
*G06F 3/0484* (2013.01)

(56) References Cited

U.S. PATENT DOCUMENTS

2010/0083190 A1 4/2010 Roberts et al.
2011/0205248 A1 8/2011 Honda et al.

FOREIGN PATENT DOCUMENTS

| JP | 2009-003851 A | 1/2009 |
| JP | 2009-129449 A | 6/2009 |
| JP | 2009-294785 A | 12/2009 |
| JP | 2010-102662 A | 5/2010 |

OTHER PUBLICATIONS

European Search Report dated Jun. 23, 2014.

* cited by examiner

INFORMATION TERMINAL DEVICE AND TOUCH PANEL DISPLAY METHOD

TECHNICAL FIELD

The present invention relates to an information terminal device and a display method of a touch panel, and more particularly to an information terminal device and a display method of a touch panel that can reduce an error in a selection operation on the touch panel of a narrow display screen using a simple operation.

BACKGROUND ART

Recently, information terminal devices such as a personal digital assistance (PDA), a notebook-sized personal computer, and a portable phone have become widespread. These are usually provided with a touch panel, and provided as devices for enabling an icon (selection item) to be selected or enabling data to be input.

Icons are used in displays of these devices. When a touch panel has a small-sized display screen in the display (particularly, when many icons are displayed on one screen or one window), each icon and an anchor (a display of a link destination or the like) are display in a small size.

Therefore, even on a small touch panel screen in the case of a portable terminal device such as a portable phone device, a touch operation is designed to be performed on the screen. However, it is difficult to select icons or anchors closely spaced in a small size in a narrow region with a finger or the like when an icon or an anchor of a browser is selected from the point of view of a user.

As the related technology, for example, in Patent Document 1, technology intended to implement a pointing operation with little error as a simple operation in a small-sized portable information terminal device is disclosed. Specifically, a central processing unit (CPU) of the portable information terminal device selects a region on a screen of a small-sized liquid crystal display according to a user operation. The CPU of the portable information terminal device extracts options of selectable information from within the selected region, and selects an option of a processing target from among the extracted options. The CPU of the portable information terminal device divides a screen into a plurality of block regions in advance, manages the plurality of block regions, and selects a block region to which an indication position belongs when detecting an indication by a user operation on the screen. In addition, a process in which the CPU of the portable information terminal device controls selection of a region of a predetermined size or a region of a predetermined shape around the indication position when detecting the indication by the user operation on the screen is disclosed.

In addition, for example, in Patent Document 2, technology for preventing an icon from being erroneously selected in an information device provided with a touch panel is disclosed. Specifically, when the user touches a selection icon on the touch panel, the touched selection icon is specified based on coordinate information output from the touch panel. Next, on the touch panel, a decision icon corresponding to the selection icon is superimposed and displayed on a region adjacent to the selection icon. When the user touches the decision icon, the information device decides the selection of the selection icon.

Further, in Patent Document 3, a display device intended to reliably select a target link while recognizing the entire browser screen even in a display device of a small screen like a portable terminal is disclosed. Specifically, the display device includes a timer, which measures time from a touch start of a user touch detected on a touch panel, a display control unit, which acquires coordinate information on a display corresponding to a touch position on the touch panel, a control unit, which obtains a moving amount of the touch position from the coordinate information acquired by the display control unit, and an enlarged display control unit, which enlarges and displays a region within a predetermined range centered on coordinates indicated by the coordinate information at a position separate from the touch position in the display when the time measured by the timer exceeds a preset time and when the moving amount of the touch position obtained by the control unit falls within a preset moving amount range.

PRIOR ART DOCUMENTS

Patent Documents

Patent Document 1: Japanese Unexamined Patent Application, First Publication No. 2002-351620A
Patent Document 2: Japanese Unexamined Patent Application, First Publication No. 2009-003851A
Patent Document 3: Japanese Unexamined Patent Application, First Publication No. 2010-102662A

DISCLOSURE OF THE INVENTION

Problems to be Solved by the Invention

However, the information terminal device described in the above-described background art has a problem in that it is difficult to perform direct selection on a narrow region with fingers in anchor selection of a browser or the like when an operation by the touch panel is performed in a device in which a size of the screen is limited as in a portable phone terminal device.

As means to solve the above-described problem, means for enlarging and displaying a position touched on the touch panel screen and getting the user to select the position is also provided. However, in this means, the user is likely to press a wrong position. On the other hand, there is a problem in that it is difficult for the user to make a selection because a scroll operation is performed even when a position is desired to be reselected in a state while the user is in contact with the touch panel.

Further, a pointer operation using a mouse has a problem in that selection of only one place is possible and a merit of a touch panel operation (that is, an advantage that many places can be immediately selected) is not used.

The technologies of the above-described Patent Documents 1 to 3 are technologies for enabling the touch panel to be easily used in relation to the above-described problem.

An outline of the present invention is that, specifically, when an arbitrary icon (movable) displayed on a screen is touched in a pointer selection method in the information terminal device equipped with a touch panel, a pointer for enabling an anchor to be selected in each of arbitrary directions extending radially from the icon, an extension line extending from a head of the pointer to an anchor in the vicinity of the pointer, and a touch region of a large display area indicated by the pointer is displayed, and an anchor indicated by the extension line of the pointer that indicates the touch region is selected when one of the touch regions has been touched. Thereby, the selection of the anchor is facilitated even in an information terminal device in which a display screen of the touch panel is narrow.

The present invention has been made in view of the above-described problems of the related art, and an object of the invention is to provide an information terminal device and a display method of a touch panel that can display a pointer for enabling an anchor to be selected when an icon has been touched and enable an anchor selection operation on a touch panel of a narrow display screen to be performed with little error in a simple operation.

Means for Solving the Problems

In order to solve the above-described problem, an information terminal device in accordance with the present invention is an information terminal device having a touch panel, including: a pointer display unit configured to display one or more pointers indicating each of anchors serving as selection candidates in one or more directions when an icon displayed on a display screen of the touch panel has been touched; a touch region display unit configured to display touch regions corresponding to the pointers in one-to-one correspondence; and an anchor selection unit configured to select the anchor indicated by the pointer corresponding to the touch region touched when one of the touch regions has been touched.

In addition, a display method of a touch panel in accordance with the present invention is a display method of a touch panel provided in an information terminal device, including the steps of: displaying one or more pointers indicating each of anchors serving as selection candidates in one or more directions when an icon displayed on a display screen of the touch panel has been touched; displaying touch regions corresponding to the pointers in one-to-one correspondence; and selecting the anchor indicated by the pointer corresponding to the touch region touched when one of the touch regions has been touched.

Effects of the Invention

According to an information terminal device of the present invention, for example, there is an effect that an operation, for example, such as selection of an anchor (for example, information indicating a link destination or the like) of a browser, can be performed with a small moving amount even when a display region is narrow in the information terminal device in which a size of a screen is limited as in a portable phone device. In addition, because pointers that are radially extended in four directions from an icon are provided, anchors located at four places can be simultaneously selected by focusing on the anchors in the vicinity thereof.

EMBODIMENTS FOR CARRYING OUT THE INVENTION

In the present invention, as in a portable phone device equipped with a touch panel, pointers are displayed in one or more directions extending in a predetermined radial shape from a position touched on a screen of a touch panel in a terminal device in which a size of a display screen is limited. Thereby, a selection operation is set to be easily performed in a narrow place within a small display screen.

In addition, a selection operation is set to be performed by causing another finger different from a finger touching the above-described screen of the touch panel to reach a specific selection position with a minimum moving amount from the position touched on the screen of the touch panel.

Hereinafter, embodiments of an information terminal device, a display method of a touch panel, and a computer program of the present invention will be described in detail with reference to the drawings.

Figure 1:
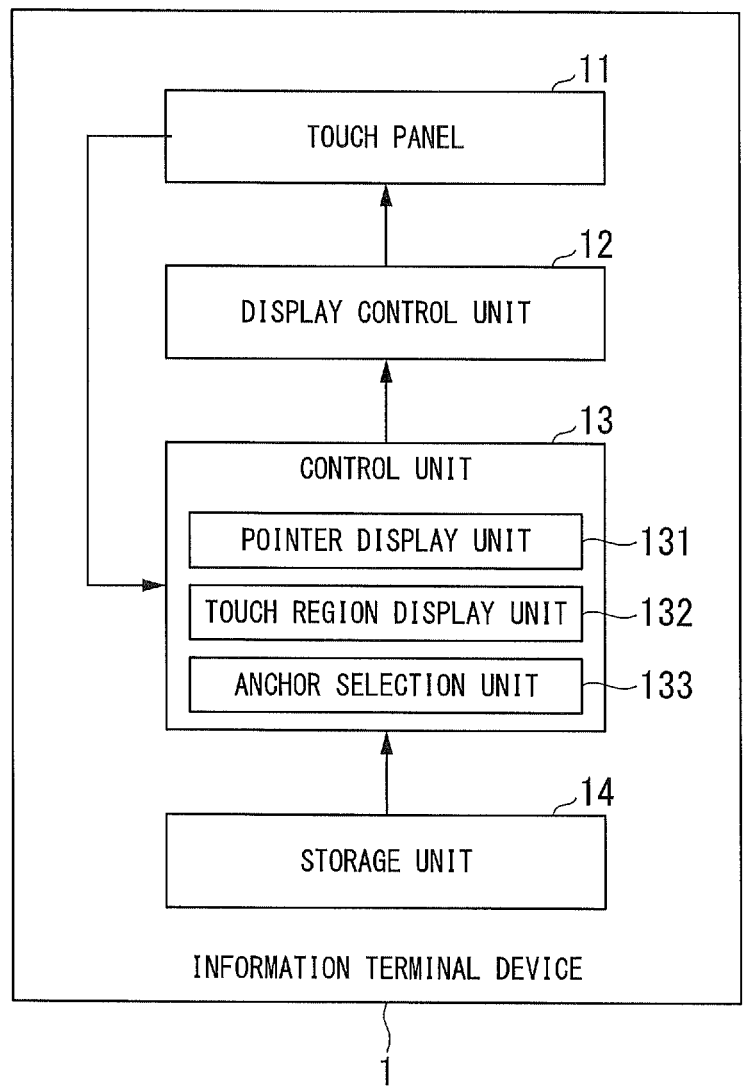
FIG. 1 is a configuration diagram illustrating the entire configuration of an information terminal device in accordance with an embodiment of the present invention.

FIG. 1 is a configuration diagram illustrating the entire configuration of an information terminal device in accordance with an embodiment of the present invention.

In FIG. 1, the information terminal device of this embodiment includes a touch panel 11 on which information can be displayed and selected, a display control unit 12, which controls the touch panel 11, a control unit 13, which controls the display control unit 12, and a storage unit 14, which stores a program and data.

As long as the touch panel 11 is provided, the information terminal device in accordance with the embodiment of the present invention may be an arbitrary information processing device, and, for example, may be a portable information terminal device. Preferably, when the present invention is applied to a portable information terminal device in which a display screen is narrow, the effect of the present invention can be more sufficiently exhibited.

Hereinafter, a function of the information terminal device in accordance with the embodiment of the present invention will be described with reference to FIG. 1.

The touch panel 11 displays information or selection items. In addition, the touch panel 11 detects an operation by a user (a touch of a finger or the like), and outputs coordinate information indicating a touched position on the screen using coordinates to the control unit 13.

The display control unit 12 is a driver that controls the touch panel 11, and displays information, selection items, icons, and the like on the touch panel 11 based on control of the control unit 13.

The control unit 13 includes a CPU, and controls the entire block of the information terminal device 1. Also, the control unit 13 performs a process (as will be described later) of specifically controlling a display of the touch panel 11.

The storage unit 14 stores a program or data for controlling the information terminal device 1.

In addition, the storage unit 14 stores an icon (selection symbol display) or image information (including information regarding a display position or the like), and stores image information (including display position information) for an anchor (here, a symbol display for displaying a link destination) to be displayed in correspondence with the icon and the like.

Hereinafter, a method of displaying information on the touch panel of the information terminal device in accordance with the embodiment of the present invention will be described.

Figure 2:
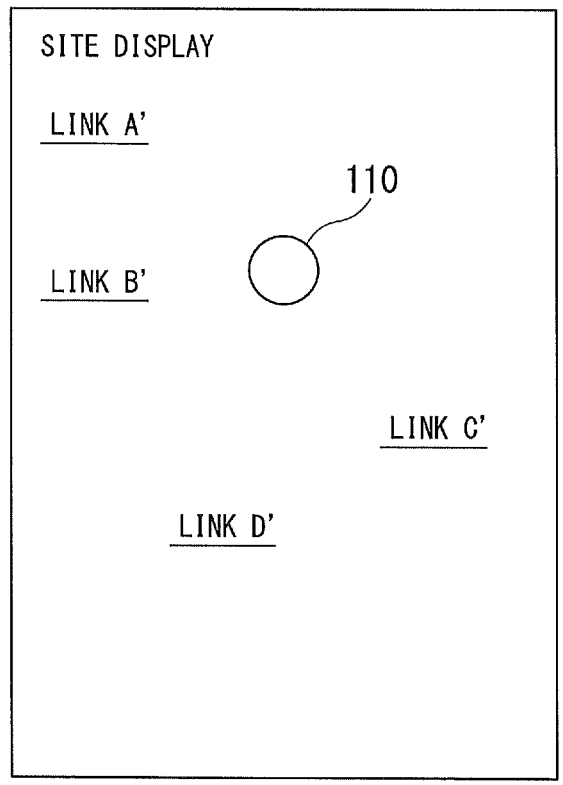
FIG. 2 is an explanatory diagram illustrating information basically displayed on a touch panel of the information terminal device in accordance with the embodiment of the present invention.

FIG. 2 is an explanatory diagram illustrating information basically displayed on a touch panel of the information terminal device in accordance with the embodiment of the present invention.

In FIG. 2, the case in which the control unit 13 displays link displays (links A' to D' in the drawing) corresponding to links and an icon 110 for selecting the links in display information of a site on the touch panel 11 is also illustrated.

The icon 110 is set to be responsible for some attribute. Each link to be indicated by pointers as will be described later may be displayed as being associated with the icon 110 or displayed as not being associated with the icon 110.

Although the displayed icon is only one icon 110 here, the number of icons to be generally displayed on the information processing terminal in accordance with the present invention is not limited to one and a plurality of icons may be displayed. Even in this case, it is assumed that functions of individual icons are equivalent to a function of the icon 110 as will be described later.

Figure 3:
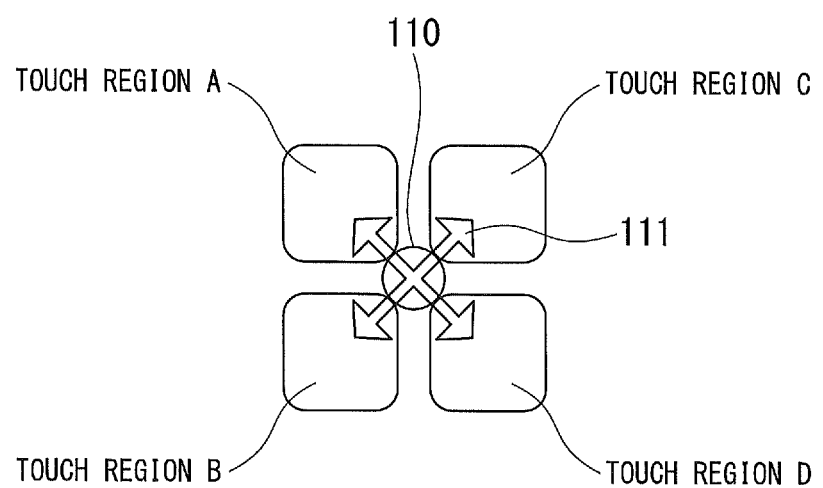
FIG. 3 is an explanatory diagram illustrating information to be displayed when an icon displayed on the touch panel of the information terminal device in accordance with the embodiment of the present invention has been touched.

FIG. 3 is an explanatory diagram illustrating information to be displayed when an icon displayed on the touch panel of the information terminal device in accordance with the embodiment of the present invention has been touched.

The control unit 13 includes a pointer display unit 131 (FIG. 1). The pointer display unit displays one or more pointers 111 (here, four pointers) for enabling the icon to be selected in one or more arbitrary directions (here, four directions) extending radially from the icon 110 via the display control unit 12 when a user has touched the icon 110. The control unit 13 includes an anchor selection unit 133 (FIG. 1). The anchor selection unit selects an anchor indicated by a pointer corresponding to a touched region when one of touch regions has been touched by the user.

It is assumed that the pointer 111 is displayed while the user is touching the icon 110 or when a predetermined time (for example, several seconds) has elapsed after a finger has been separated from the icon 110.

In addition, the control unit 13 includes a touch region display unit 132 (FIG. 1), and the touch region display unit displays touchable regions (here, touch regions A to D) at each position adjacent to the icon 110 in each of four directions indicated by the pointer 111.

When touching a display position of the icon 110 using a finger or the like, the user can move the icon 110 using the finger or the like. In addition, with movement of the icon 110, the pointers 111 and the touch regions A to D can also be moved in a state in which relative distance intervals from the icon 110 are maintained. Consequently, the user can move a display position of the icon 110 to the vicinity of an anchor to be selected.

When the user has touched a touch region of one display region using a finger different from the finger touching the display position of the icon 110, the control unit 13 can select a link corresponding to a position on a screen indicated by the pointer 111.

Figure 4:
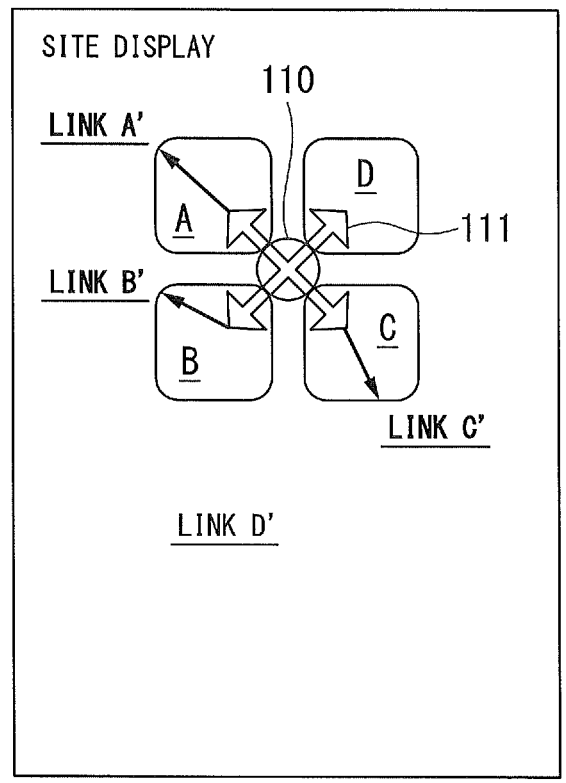
FIG. 4 is an explanatory diagram illustrating an example of specific detailed information to be displayed when an icon displayed on the touch panel of the information terminal device in accordance with the embodiment of the present invention has been touched.

FIG. 4 is an explanatory diagram illustrating an example of specific detailed information to be displayed when an icon displayed on the touch panel of the information terminal device in accordance with the embodiment of the present invention has been touched.

In FIG. 4, link displays (here, links A' to D') for linking to other screen positions on general web pages and an extension line of a pointer extending from each head of pointers of the four directions to each link display in the vicinity of the head are displayed in addition to the display illustrated in FIG. 3. In this example, the link D' is not within the touch region D.

The control unit 13 selects the link A' corresponding to the touch region A, for example, when the user has touched the touch region A, using a finger different from a finger touching a display position of the icon 110. Immediately thereafter, the control unit 13 displays a screen indicated by the link A' on the touch panel 11.

Figure 5:
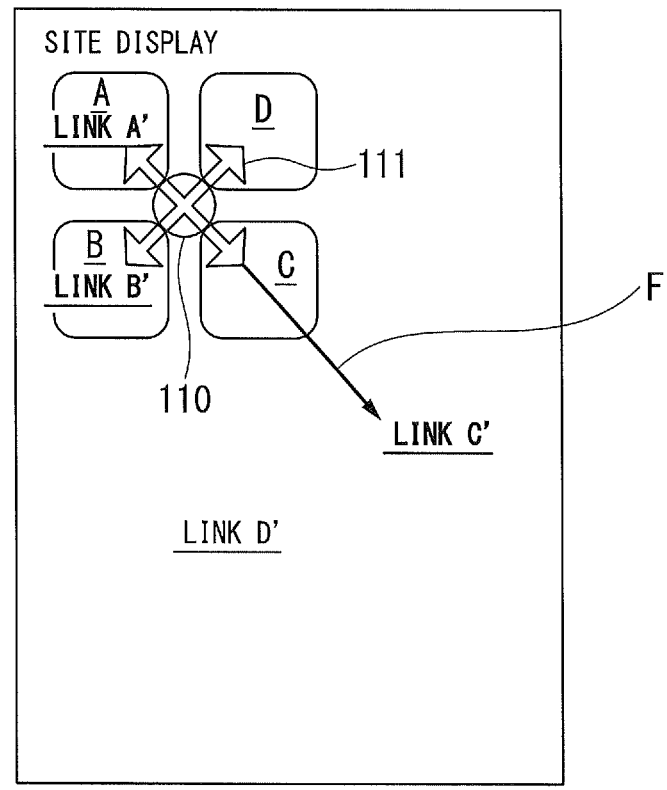
FIG. 5 is an explanatory diagram illustrating another display example of specific detailed information to be displayed when an icon displayed on the touch panel of the information terminal device in accordance with the embodiment of the present invention has been touched.

FIG. 5 is an explanatory diagram illustrating another display example of specific detailed information to be displayed when an icon displayed on the touch panel of the information terminal device in accordance with the embodiment of the present invention has been touched.

It is not necessary for the above-described link display to be constantly within the above-described touch region. In this case, the control unit 13 can focus on a link display at a screen position at which a distance from the displayed pointer is closest. More specifically, for example, it is possible to indicate a link display using a method of displaying a line that makes a connection to a link display at the closest distance from the top of the pointer or the like.

In FIG. 5, the case in which a link (here, the link C') indicated by the pointer 111 is not on a touch region (here, the touch region C) and the touch region (here, the touch region C) is caused to be at a protruding display screen position so as to move the icon 110 from the state illustrated in FIG. 4 is illustrated.

Although a link (here, the link D') indicated by the pointer 111 is also not on a touch region (here, the touch region D) (is not originally thereon) and the touch region (here, the touch region D) is at a protruding display screen position, the link C' is focused as indicated by an arrow F because the link C' is closer than the link D' in the distance from the top of the pointer 111.

Figure 6:
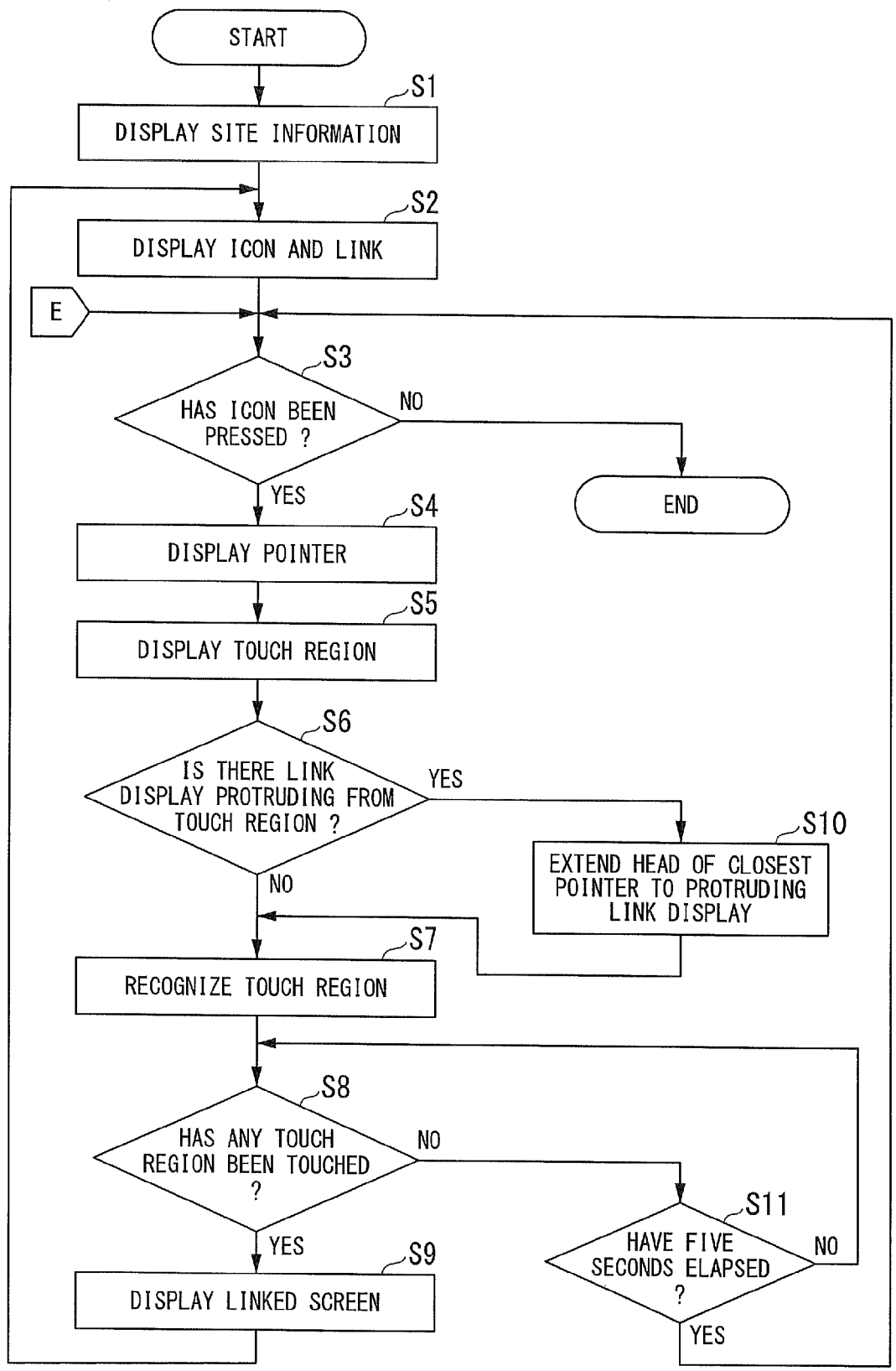
FIG. 6 is a flowchart diagram illustrating an operation of a control unit of the information terminal device in accordance with the embodiment of the present invention.

FIG. 6 is a flowchart diagram illustrating an operation of the control unit 13 of the information terminal device in accordance with the embodiment of the present invention.

Hereinafter, a screen display operation by the control unit 13 of the information terminal device in accordance with the embodiment of the present invention will be described with reference to FIGS. 1 to 5 and the flowchart of FIG. 6.

First, in step S1, the control unit 13 displays site information. This display may be performed from a browser or the like via the control unit 13.

Next, in step S2, the control unit 13 displays an icon for selecting links and the links while the site information is displayed as illustrated in FIG. 1 (see FIG. 2).

Next, the control unit 13 verifies whether the displayed icon has been pressed (specifically, touched) in step S3, and starts other processing by ending processing when no icon has been pressed. In addition, when the displayed icon has been pressed, the process moves to step S4.

In step S4, the control unit 13 displays the pointers 111 (see FIG. 3).

In step S5, the control unit 13 displays the touch regions A to D (see FIG. 3)

Next, the control unit 13 verifies whether there is a link display protruding from a displayed touch region in step S6, moves to step S10 when there is a link display protruding from the displayed touch region, and proceeds to step S7 when there is no display protruding from the displayed touch region.

In step S7, the control unit 13 recognizes the touch region. More specifically, the control unit 13 assigns the same function as in the link display to the touch region including the link display or a touch region through which the extension line of the pointer has passed in step S10.

The control unit 13 verifies whether any touch region has been touched in step S8, moves to step S11 when no touch region has been touched, and proceeds to step S9 when any touch region has been touched.

In step S9, the control unit 13 displays a web screen of a link destination displayed by a link display corresponding to the touched touch region.

The control unit 13 displays an extension line obtained by extending a head of a pointer at a closest distance from the touch region to the protruding link display in step S10, also assigns the same function as in the pointer to the extension line, and then moves to step S7.

The control unit 13 verifies whether five seconds have elapsed after the icon has been pressed in step S11, returns to step S8 when the five seconds have not yet elapsed after the icon has been pressed, and returns to step S3 when the five seconds have elapsed after the icon has been pressed.

Also, because the process is also likely to return from a processing step (not illustrated) out of a range of the flowchart illustrated in FIG. 6 to step S3, another page joint element E for entering a process from step S3 is provided.

In addition, the icon can also be included in transmitted web information, and may be displayed by the browser.

According to the information terminal device in accordance with this embodiment, a selection operation can be performed on a narrow region because an anchor (for example, information indicating a link destination or the like) of a browser can be selected with a small moving amount by the user's finger in a terminal device in which a size of a screen is limited as in a portable phone device.

In addition, because pointers are provided in four directions, anchors of four places can be simultaneously selected by focusing on the anchors in the vicinity thereof.

Other Embodiments

A display method of the information terminal device in accordance with this embodiment is also applicable when a screen other than browsing such as a menu of a portable phone device is processed.

In addition, as another embodiment of the present invention, the pointer is not limited to four directions, and an arbitrary number of directions exceeding four directions can be displayed. For example, the pointer to be displayed can be displayed in eight directions extending radially from the icon.

At least part of a process of each component of the information terminal device in accordance with the present invention may be executed by computer control. A program for causing a computer to execute the above-described process according to the procedure illustrated in the flowchart of FIG. 6 may be distributed by storing the program in a computer-readable recording medium such as a semiconductor memory, a compact disc-read only memory (CD-ROM), or a magnetic tape. Computers including at least a microcomputer, a personal computer, and a general-purpose computer in a category may read the above-described program from the above-described recording medium and execute the read program.

This application is based upon and claims the benefit of priority from prior Japanese Patent Application No. 2010-211802, filed Sep. 22, 2010, the entire contents of which are incorporated herein.

INDUSTRIAL APPLICABILITY

An information terminal device, which can enable an anchor selection operation on a touch panel of a narrow display screen to be performed with little error in a simple operation, can be provided.

DESCRIPTION OF REFERENCE SYMBOLS

1 Information terminal device (device of present invention)
11 Touch panel
12 Display control unit
13 Control unit
14 Storage unit
110 Icon
111 Pointer
A Touch region
B Touch region
C Touch region
D Touch region
A' Link display
B' Link display
C' Link display
D' Link display

The invention claimed is:

1. An information terminal device having a touch panel, comprising:
    a pointer display unit configured to display one or more pointers indicating anchors serving as selection candidates in one or more directions when an icon displayed on a display screen of the touch panel has been touched;
    a touch region display unit configured to display touch regions corresponding to the pointers in a one-to-one correspondence; and
    an anchor selection unit configured to select the anchor indicated by the pointer corresponding to the touch region touched when one of the touch regions has been touched,
    wherein the pointer includes an extension line extending from a head of the pointer to an anchor at a closest distance position on the display screen, and
    wherein each of the anchor indicated by the pointer, the pointer, the extension line of the pointer, and the touch region is continuously displayed until a predetermined time has elapsed after a touch for the anchor has been released.

2. The information terminal device according to claim 1, wherein, when information has been displayed on the display screen of the touch panel, the icon is displayed along with the displayed information.

3. The information terminal device according to claim 1, wherein, when information transmitted to the display screen of the touch panel has been displayed, the icon is included in a display of the transmitted information and already displayed.

4. The information terminal device according to claim 1, wherein the icon is movable to an arbitrary position in a state in which the icon has been touched on the display screen.

5. The information terminal device according to claim 1, wherein the pointer extends radially from the icon in one or more directions on the display screen.

6. The information terminal device according to claim 1, wherein the anchor indicated by the pointer is displayed as a selection candidate corresponding to the icon.

7. The information terminal device according to claim 1, wherein the anchor comprises a link indicating a link destination for a screen which is not currently displayed.

8. The information terminal device according to 2, wherein the icon is movable to an arbitrary position in a state in which the icon has been touched on the display screen.

9. The information terminal device according to 3, wherein the icon is movable to an arbitrary position in a state in which the icon has been touched on the display screen.

10. The information terminal device according to claim 2, wherein the pointer extends radially from the icon in one or more directions on the display screen.

11. The information terminal device according to claim 3, wherein the pointer extends radially from the icon in one or more directions on the display screen.

12. The information terminal device according to claim 4, wherein the pointer extends radially from the icon in one or more directions on the display screen.

13. The information terminal device according to claim 2, wherein the anchor indicated by the pointer is displayed as a selection candidate corresponding to the icon.

14. A display method of a touch panel provided in an information terminal device, said method comprising:
   displaying one or more pointers indicating anchors serving as selection candidates in one or more directions when an icon displayed on a display screen of the touch panel has been touched;
   displaying touch regions corresponding to the pointers in a one-to-one correspondence; and
   selecting the anchor indicated by the pointer corresponding to the touch region touched when one of the touch regions has been touched,
   wherein the pointer includes an extension line extending from a head of the pointer to an anchor at a closest distance position on the display screen, and
   wherein each of the anchor indicated by the pointer, the pointer, the extension line of the pointer, and the touch region is continuously displayed until a predetermined time has elapsed after a touch for the anchor has been released.

* * * * *